Patented July 5, 1938

2,122,483

UNITED STATES PATENT OFFICE 2,122,483

METHOD AND MEANS FOR ACIDIZING WELLS

Paul L. Menaul, Duncan, Okla., assignor to Halliburton Oil Well Cementing Company, Duncan, Okla.

No Drawing. Application January 11, 1937, Serial No. 120,044

4 Claims. (Cl. 166—21)

This invention relates to the acidizing of oil wells, and more particularly to means and methods for treating one formation of a well with acid while protecting an adjacent formation from the acid.

In the acidizing of oil wells it often appears that two or more layers of oil bearing formations are separated by some rock or sand which does not bear oil. If all of these strata are treated with acid, undesirable results are obtained in that the non-oil bearing formation is rendered porous as well as the oil bearing formation and this often results in water being obtained with the oil or otherwise interfering with the desired increased production of the well.

It is customary therefore to treat an oil well having two oil bearing formations by first acidizing one formation then placing some inert liquid or solution in the well to block off the formation which has been acidized so that acid can then be supplied to the second formation. These inert liquids or solutions are usually referred to as blanketing solutions. Some examples of substances which may be used for this purpose are disclosed in the co-pending application of C. E. Clason, Serial No. 114,586, filed December 7, 1936, for "Acid treatment of wells".

It has been proposed to use a blanketing solution of a high specific gravity to retard the flow of acid into the blanketing solution. A high specific gravity calcium chloride solution has commonly been employed for this purpose. The use of a high specific gravity blanketing solution has some disadvantages, however, in that the blanketing solution also penetrates the lower oil bearing formation and is thus wasteful. Where the oil bearing formations are separated some distance the cost of the blanketing solution is considerable. Moreover, even though a high specific gravity calcium chloride solution is employed, the acid supplied to the upper oil bearing formation is readily miscible with it and flows downwardly therethrough for that reason.

It is an object of the present invention to devise a blanketing solution for use in the acidizing of wells of the type mentioned above which will have a high viscosity rather than a high specific gravity.

It is a further object of the invention to devise means and methods for acidizing an oil well in which a blanketing solution is provided which is practically immiscible with the acid and which retains its property of immiscibility for a sufficient period of time to enable the acid to be pumped into the proper formations.

It is still another object of the invention to provide a blanketing solution which will have a high viscosity and be practically immiscible with acid as soon as it is placed in the well without waiting for any chemical reaction to take place.

It is still a further object of the invention to provide a blanketing solution which will not penetrate any porous strata or formation to any appreciable extent.

Other objects and advantages reside in certain novel features of the method and chemicals used as will be apparent from the following detailed description:

In attaining the above objects it is proposed to employ a solution of calcium chloride which is the same or of a lower specific gravity than the acid with which the well is to be treated. In order to increase the viscosity of the calcium chloride solution it is proposed in accordance with the present invention to add to the solution some non-jellifying, water-soluble gum, such as locust bean gum. It has been discovered that by adding a one-half of one per cent by weight of such a water-soluble gum to a calcium chloride solution of a concentration of about ten per cent, the viscosity is greatly increased.

Untreated aqueous solution of calcium chloride has practically the same viscosity as water. When measuring the viscosity on a modified Stormer viscometer of the type disclosed on page 1273 of Chemical Engineers' Handbook, by Perry, First Edition, 1934, McGraw-Hill Book Company, New York, the centipoise reading for a ten per cent calcium chloride solution has been found to be about 1. After one-half of one per cent by weight of locust bean gum has been added to this calcium chloride solution the centipoise reading has been found to be 27. This increased viscosity occurs without any appreciable increase in the specific gravity of the solution.

For purposes of explanation, it should be stated here that a centipoise is 1/100th of a poise, which is the c. g. s. unit for measuring viscosity and is commonly defined as that force which when exerted tangentially on one square centimeter surface of either of two horizontal planes, one centimeter apart, will move one plane at the rate of one centimeter per second in reference to the other plane, the space between the two planes being filled with viscous liquid. This force is measured in dynes.

Experience in acidizing wells leads one to the conclusion that the best blanketing solution is one which will retain its liquid state and not jellify by which will nevertheless not penetrate any porous formation and which is highly immiscible with acid solutions. Whether the blanketing solution is used to space bodies of acid the proper distance between two separated oil bearing formations, or whether it is used merely to fill a hole up to the point where it is desired that the acid shall enter the formation of the well, it is important in calculating the quantity of blanketing solution to be placed in the well to know how much of it is going to be wasted due to penetration into the formation of the well. Since the porosity of formations vary, it is highly desirable to prevent the blanketing solution from penetrating at all. If this can be done, it is a simple matter to calculate how much blanketing solution should be placed in the well to bring its surface to a desired point in the well.

Similarly, it is desirable in determining how much acid is to be pumped into the well to know how much acid is being wasted by mixing with the blanketing solution.

The present invention renders it possible to make these calculations exactly because the blanketing solution is of such high viscosity that it does not penetrate the formation and because it is practically immiscible with the acid.

The action of all blanketing solutions heretofore proposed has been more in the nature of a diluent than as a true blanket. The acid has penetrated this diluent but upon mixing with it the action of the acid upon the formation has been lessened or deadened. The blanket of high viscosity does not act in this way because the two solutions do not mix. The acid is sustained above the column of the blanketing solution and is not affected thereby.

The action of the blanketing solution of the present invention has the same effect as though the well were effectively plugged at some point as by means of cement. Even if the well were plugged by cement, however, the acid would eat down around the cement and the best results would not be obtained. By using a highly viscous but non-jellifying liquid the plugging action is obtained but at the same time the liquid retains sufficient mobility to conform to irregularities in the well bore and maintain an effective seal.

The blanketing solution of the present invention is thus thin enough to pump into the well but of a sufficiently high viscosity to form a mobile plug.

It has been proposed heretofore to provide a blanketing solution which will effect a jelly seal upon being pumped into a formation which has been treated with acid. The formation of a jelly seal has the disadvantage that it takes some time for the liquid to solidify or congeal and therefore a considerable quantity goes into the formation of the well while in a liquid condition. The liquid penetrates the pores of the formation before it has a chance to congeal and there is therefore no assurance as to where the top of the blanket really is. Not only is this detrimental in that a considerable quantity of the blanketing solution is wasted, but the use of such a jelly-forming blanket solution often results in causing the acid added to the well afterwards to penetrate into the wrong formation. Such jelly-forming solutions do not generally have a viscosity greater than that of water when they are pumped into the well and therefore penetrate the formation easily. When using a blanketing solution in accordance with the present invention, however, none of the blanketing solution penetrates the formation and no time is required in waiting for the plugging action to take place.

An ordinary calcium chloride solution goes right through ordinary sand. After calcium chloride solution is treated as outlined above, however, the solution penetrates a sand only a slight amount. The penetration differs in different capillary formations but acts as a filler in the pores of the formation. Because a weak solution of calcium chloride may be used, a better blanket can be obtained at about one-third the cost of raising the specific gravity of calcium chloride by increasing its concentration.

A particular advantage of the present invention results from the fact that after a period of time, say two or three days, the calcium ion in the solution has the property of thinning the gum. In laundry work it is common experience to find that the gum has thinned up. The calcium ion is said to spoil the gum. This property is advantageous in the acidizing of oil wells, however, in that after the blanketing solution has stood in the well for awhile it will pump out like any brine.

Not only is the blanketing solution of the present invention practically immiscible with acid, but it is also practically immiscible and insoluble in oil and this property tends to prevent the blanketing solution from entering any oil-bearing formation with the result that less blanketing solution is required than is normally the case.

While only one embodiment of the invention has been disclosed herein, it is obvious that various substances might be used to provide an increased viscosity in a blanketing solution and that the invention may be used in various ways without departing from the spirit of the invention or the scope of the annexed claims.

I claim:

1. The method of acidizing an oil well or the like which includes forming a highly viscous blanketing solution by mixing a small percent of a non-jellifying water soluble gum in an aqueous salt solution, placing the solution so formed in a portion of the well and supplying acid to the well on one side of said blanketing solution.

2. The method of acidizing an oil well or the like which includes forming a highly viscous blanketing solution by mixing a small percent of locust bean gum in an aqueous solution of calcium chloride, placing the solution so formed in a portion of the well and supplying acid to the well on one side of said blanketing solution.

3. A blanketing solution adapted for use in the acidizing of oil wells or the like which consists of an aqueous salt solution together with a small percent of a non-jellifying water soluble gum of such a character as to increase the viscosity of the salt solution, the solution being characterized further by the fact that the viscosity becomes lower some hours after the addition of the gum to the salt solution.

4. A blanketing solution adapted for use in the acidizing of oil wells or the like which consists of an aqueous solution of calcium chloride together with a small percent of locust bean gum, said solution having a high viscosity.

PAUL L. MENAUL.